US009110621B2

(12) United States Patent
Mickeleit

(10) Patent No.: US 9,110,621 B2
(45) Date of Patent: Aug. 18, 2015

(54) METHOD AND APPARATUS FOR PERFORMING PRINTING USING A REMOTE RENDERING SERVICE

(71) Applicant: CORTADO AG, Berlin (DE)

(72) Inventor: Carsten Mickeleit, Berlin (DE)

(73) Assignee: Cortado AG, Berlin (DE)

( * ) Notice: Subject to any disclaimer, the term of this patent is extended or adjusted under 35 U.S.C. 154(b) by 0 days.

(21) Appl. No.: 13/628,617

(22) Filed: Sep. 27, 2012

(65) Prior Publication Data

US 2013/0077122 A1 Mar. 28, 2013

(30) Foreign Application Priority Data

Sep. 28, 2011 (DE) .......................... 10 2011 054 020

(51) Int. Cl.
*G06K 15/02* (2006.01)
*G06F 3/12* (2006.01)
(52) U.S. Cl.
CPC ............ *G06F 3/1292* (2013.01); *G06F 3/1204* (2013.01); *G06F 3/1228* (2013.01); *G06F 3/1245* (2013.01)
(58) Field of Classification Search
None
See application file for complete search history.

(56) References Cited

U.S. PATENT DOCUMENTS

| 7,266,616 B1* | 9/2007 | Munshi et al. ................ 709/246 |
| 2002/0093538 A1* | 7/2002 | Carlin ........................... 345/778 |
| 2003/0038963 A1 | 2/2003 | Yamaguchi |
| 2003/0051044 A1 | 3/2003 | Parry et al. |
| 2003/0069921 A1* | 4/2003 | Lamming et al. ............. 709/203 |
| 2004/0122932 A1* | 6/2004 | Mickeleit ....................... 709/223 |
| 2004/0139229 A1* | 7/2004 | Mickeleit ....................... 709/245 |
| 2005/0086282 A1 | 4/2005 | Anderson et al. |
| 2005/0223390 A1* | 10/2005 | Moore .......................... 719/321 |
| 2006/0129632 A1* | 6/2006 | Blume et al. .................. 709/203 |
| 2009/0168699 A1* | 7/2009 | Lo ................................. 370/328 |
| 2010/0033762 A1* | 2/2010 | Mickeleit ..................... 358/1.15 |
| 2010/0225957 A1* | 9/2010 | Liu ............................... 358/1.15 |
| 2011/0199640 A1* | 8/2011 | Shirai ........................... 358/1.15 |
| 2011/0222105 A1* | 9/2011 | Wang et al. .................. 358/1.15 |
| 2012/0019864 A1* | 1/2012 | Mickeleit et al. ............. 358/1.15 |
| 2012/0026536 A1* | 2/2012 | Shah ............................ 358/1.15 |

FOREIGN PATENT DOCUMENTS

| DE | 102 38 591 B4 | 8/2004 | |
| DE | 601 32 548 T2 | 1/2009 | |
| EP | 1471418 A2 | 10/2004 | |
| EP | 2365431 A2 | 9/2011 | |
| GB | 2332764 A | 6/1999 | |
| WO | 2004/057836 A1 | 7/2004 | |
| WO | WO 2010092161 A1 * | 8/2010 | ............... G06F 3/12 |

* cited by examiner

*Primary Examiner* — David S Cammack
(74) *Attorney, Agent, or Firm* — Norris McLaughlin & Marcus, P.A.

(57) ABSTRACT

The invention relates to a printing process, an arrangement for realizing the printing process and a corresponding computer program and a corresponding computer-readable storage medium which, in particular, enables wireless printing via Wi-Fi (Wireless Local Area Network) or Bluetooth® from a desktop computer or a laptop independent of a printer-specific driver installation and printer configuration on the computer.

11 Claims, 3 Drawing Sheets

METHOD AND APPARATUS FOR PERFORMING PRINTING USING A REMOTE RENDERING SERVICE

Figure 1:
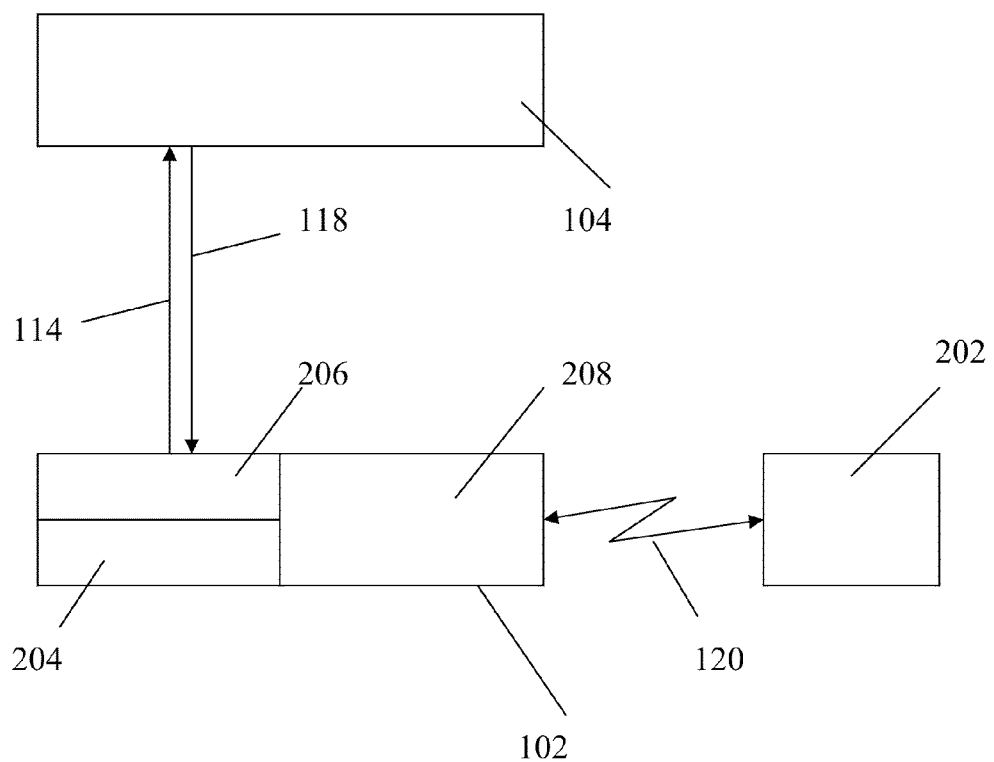

The invention relates to a printing process, an arrangement for realizing the printing process and a corresponding computer program and a corresponding computer-readable storage medium, which in particular enable printing from a desktop computer or laptop regardless of a printer-specific driver installation and printer configuration on the computer via Wi-Fi (Wireless Local Area Network) or Bluetooth®.

In conventional solutions in the technical field of the invention, for example, difficulties arise when a computer user wants to print in an environment where he has access to printers, where however no driver adapted for a printer in the local environment of the computer is installed on the computer.

The object of the invention is thus to provide a printing process, an arrangement for realizing the printing process and a corresponding computer program and a corresponding computer-readable storage medium, which obviate the disadvantages of the conventional solutions and which more particular allow the use of printers which themselves lack corresponding printer drivers.

With the present invention, the number of printers that allow printing from a data processing device can advantageously be increased. For this purpose, according to the present invention, a printer driver is stored on a first data processing device, which preferably is a mobile data processing device, wherein the printer driver generates, for example during installation on the first data processing device, a print object with an associated output port The printer driver is here a type of generic printer driver which converts data to be printed into a printer-independent format. When data, such as contents, is to be printed, the process of the invention provides that the inventive printer object is used for this purpose.

Contents hereinafter refers to files and data that can be visualized and printed by using application programs. The inventive printer object may, for example, be integrated like any conventional printer object in the print system of the first data processing device and offered to a user in print menu, wherein the print menu may be opened conventionally by activating a print function or a print button from within an application.

When a user, for example from within an application, begins to print contents by using a conventionally provided print function, a connection to a second data processing device is established via the output port according to the invention. The second data processing device may be a print server or a server of a service provider. The second data processing device provides information to the first data processing device about printers that are supported by a print server, wherein the print server may be the second data processing device itself, or a third data processing device. In a preferred embodiment, the information includes at least information about printers, such as printer types or printer names, and/or information about printer drivers. The information may be provided to the first data processing device via push or pull technologies.

The first data processing device further determines printers that can be reached via a wireless interface of the first data processing device. This determination can be made before or after printing is initiated.

In a preferred embodiment, the printers supported by the print server as well as the printers accessible via the wireless interface may be provided to the user. This may take place, for example, via a selection menu on a graphic user interface of the first data processing device. The user selects from these printers a printer that can be wirelessly connected with the first data processing device and that is also supported by a corresponding printer driver from the print server.

According to a preferred embodiment, the printers that can be accessed and the printers that are supported are automatically matched by the first data processing device, which then offers the user a list of usable printers representing at least a portion of the intersection of the reachable and supported printers.

The generic printer driver, which is installed on the first data processing device, converts the data to be printed into a printer-independent format. After the user has selected a specific printer for printing, the data converted into the device-independent format and information about the selected printer are transmitted via the output port to the second or third data processing device. In a preferred embodiment, the data and information are transmitted to the second data processing device if the second data processing device includes a print server. Transmission to the third data processing device, which then includes a print server, may be provided when the second data processing device is, for example, a server of a service provider without a print server. The data and information may be sent to the third data processing device via the server of a service provider.

The print server automatically determines the appropriate printer driver from the information about the selected printer, renders the data to be printed in a coordinated, printer-specific format matched to the selected printer and sends the rendered data via the first data processing device to the selected printer.

The invention thus provides a process which converts contents to be printed by a user into a predetermined format on the first data processing device. This predetermined format is designed so that this format may be received by a second data processing device and processed further. The predetermined format is preferably an intermediate or a generic format. The predetermined format may be, for example, a text format such as the Microsoft® Word format, a PDF format (PDF=Portable Document Format), the device-independent EMF format (EMF=Windows Enhanced Metafile) and the like.

The contents converted into this predetermined device-independent format is then transmitted to the second data processing device in combination with information about one or more printers, where the contents is to be printed. This second data processing device may be configured as a print server. The second data processing device may be arranged in a LAN or in a so-called Cloud. In the first case, the communication between the first and second data processing device is based on one of the known communication protocols for LAN, in the second case on a protocol for communication via the Internet.

According to the invention, the at least one printer used for printing is determined by the first data processing device. Preferably, the printers that can be accessed via a wireless interface are determined by the first data processing device. These may be printers equipped with a Bluetooth® interface or printers in a LAN (Local Area Network), wherein the LAN has a wireless access point, such as a W-LAN access.

The second data processing device may also transmit to the user on the first data processing device a list of device-specific printer drivers supported by the second data processing device. This list is matched to the printers determined by the first data processing device, resulting in a list of usable printers. Usable printers refer to those printers that are accessible from the first data processing device via a wireless communication link and for which the corresponding printer drivers are provided by the second data processing device. A person of ordinary skill in the art will appreciate that a printer is accessible over a wireless communication link when the printer itself has a wireless interface, or when the printer is arranged in a wired network and the network providing a wireless access point.

A list of printers may exist on the first data processing device, wherein the list results from the first data processing device from a previous own search for printers in the environment of the first data processing device and/or from printers previously reported by the second data processing device. However, the first data processing device preferably receives before each printout from the second data processing device information about the printer drivers supported by the second data processing device. This information may be communicated automatically by the second data processing device, or only upon a request from the first data processing device.

The sequential order in which the printer (s), on which printing is to take place, is determined, and the transmission of the list of the supported printer drivers from the second to the first data processing device is freely selectable. In the process of the invention, the sequential order is selected so that the usable printers can be determined as a result of these two steps.

The user selects from the list of useable printers at least one printer on which the contents will be printed. Information about these printers, such as the name of the associated device-specific driver, the printer model, the type of printer and the like, together with the contents converted into the predetermined format are transmitted to the second data processing device. The information about the at least one printers on which the contents will be printed is extracted on the second data processing device and the contents is rendered with the help of at least one device-specific printer driver associated with the selected printer. At least one software module enabling communication with the first data processing device and extraction of the information about the at least one selected printer is installed on the second data processing device. Rendering can be performed on the second data processing device or on a third data processing device.

The rendered data are transmitted to the first data processing device. The first data processing device transmits the rendered print data via a wireless communication link to the at least one selected printer, where the contents is printed. In an alternative embodiment, the rendered print data from the second data processing device are transmitted to a network printer.

In a preferred embodiment of the invention, a printer object may be created on the first data processing device which, when invoked, at least converts the contents into the predetermined, device-independent format, adds the information about the at least one selected printer where the contents is to be printed to the converted contents, and transmits these data to a printer port set up on the first data processing unit.

Advantageously, the inventive printing process is started by calling a print function. Advantageously, this print function may be called in a conventional manner from an application such as Microsoft® Word, Excel, and the like. According to a preferred embodiment, the inventive printer object appears in a print menu of the print function in addition to conventional printer objects. The inventive printer object is handled by the print function like any other printer that is set up on the first data processing device. A driver converting the printed contents in the specified format is assigned to the inventive printer object.

An arrangement according to the invention includes at least one chip and/or processor, and is configured to carry out a printing process, wherein contents to be printed is converted on a first data processing device into at least one predetermined device-independent format, the contents converted into the predetermined device-independent format is transmitted by the first data processing device to a second data processing device together with information about at least one printer on which the contents is to be printed, the second data processing device causes the contents to be rendered, and the data generated by the rendering process are transmitted to at least one of the printers. The arrangement includes at least a first and a second data processing device.

In an exemplary arrangement, at least one printer driver adapted to generate a printer object with an associated output port may be stored on the first data processing device. Printers, which can be connected for communication from the first data processing device via a wireless interface, are determined by the first data processing device and the following process is carried out when initiating printing of contents by using the printer object:

establishing a connection with a second data processing device via the output port, and transmitting to the first data processing device information at least about printers supported by the second or by a third data processing device, selecting at least one printer that is supported by the second or third data processing device, converting with the printer driver the contents to be printed into at least one device-independent format, transferring the contents present in a device-independent format and information about the selected printer to the second data processing device via the output port, rendering the contents on the second or a third data processing device, and transferring the data generated by rendering to at least one of the selected printers.

Preferably, the first data processing device includes means which convert the contents to be printed into the predetermined device-independent format. In a preferred embodiment, means for determining printers accessible from the first data processing device via a wireless communication link are provided on the first data processing device. According to another preferred embodiment, means may be provided on the first data processing device, which are capable of establishing a connection to the second data processing device via the output port, and of transmitting to the first data processing device information about printers supported by the second or a third data processing device. According to another preferred embodiment, means which allow selection of at least one printer supported by the second or third data processing device may be provided on the first data processing device. According to another preferred embodiment, means may be provided on the first data processing device, which add information about the at least one selected printer on which the contents is to be printed to the contents converted into the specified device-independent format. In another preferred embodiment, means may be provided on the first data processing device which transmit the contents converted into the predetermined device-independent format, optionally together with information about the at least one selected printer, to the output port of the first data processing device. Advantageously, the first data processing device may have at least one wireless interface. The wireless interface may be, for example, a Bluetooth® interface, a wireless LAN interface and the like.

For communicating with the first data processing device, a communication module is installed on the second data processing device. This communication module receives the contents converted into the predetermined device-independent format and the information about the printer to be used for printing and sends the rendered data and the list of supported printer drivers to the first data processing device.

In a preferred embodiment, a number of printer drivers for installed printer are stored on the second data processing device. Information on these printer drivers is transmitted to the first data processing device in form of the aforementioned list of supported printer drivers.

According to a preferred embodiment of the invention, means exist on the second data processing device, which read the data received from the first data processing device (converted contents and information about the at least one printer), and which extract from the data the information about the at least one printer. According to another preferred embodiment of the invention, the second data processing device includes means which, after evaluating the information about the at least one printer, render the contents to be printed by using at least one device-specific printer driver. Thus, print data are available which can be processed by the at least one selected printer.

Preferably, rendering is performed by a print server. The print server may be part of the second data processing device or part of a third data processing device.

An inventive computer program allows, after having been loaded into a memory of the data processing system, to perform a printing process, wherein contents to be printed is converted on a first data processing device into at least one predetermined device-independent format, the contents converted into the predetermined device-independent format by the first data processing device is transmitted to a second data processing device together with the information about at least one printer, on which the contents is to be printed, the second data processing device causes the contents to be rendered, and the data generated by the rendering process are transmitted to at least one of the printers.

In a preferred embodiment, the computer program includes at least one printer driver, which is adapted to produce a printer object with an associated output port and which enables the data processing system to execute a printing process, wherein the first data processing device identifies those printers that can be connected for communication from the first data processing device via a wireless interface and wherein, when printing of contents is initiated by using the printer object, at least the following is executed:
  establishing a connection via the output port to a second data processing device, and transmitting to the first data processing device information about printers supported by at least by the second or a third data processing device,
  selecting at least one printer that is supported by the second or third data processing device,
  converting with the printer driver the contents to be printed into at least one device-independent format,
  transmitting the contents that is present in a device-independent format and information about the selected printer via the output port to the second data processing device,
  rendering the contents on the second or a third data processing device, and
  transmitting the data generated by the rendering process to at least one of the selected printers.

According to another preferred embodiment of the invention, the inventive computer program is modular, wherein individual modules are installed on various parts of the data processing system.

Advantageous embodiments provide additional computer programs configured to execute additional process steps or process flows described in the description.

Such computer programs can be provided, for example, (fee-based or free of charge, freely accessible or password-protected) for downloading in a data or communication network. The provided computer programs may also be used with a process wherein a computer program according to claim 9 is downloaded from an electronic data network, for example from the Internet, to a data processing system connected to the data network.

To carry out the inventive printing process, a computer-readable storage medium may be employed on which a program is stored which allows a data processing system, after it has been loaded into a memory of the data processing system, to perform a printing process, wherein contents to be printed is converted by the first data processing device into at least one predetermined device-independent format, the contents converted into the predetermined in the device-independent format is transmitted to a second data processing device together with information about at least one printer on which the contents is to be printed, the second data processing device causes the contents to be rendered, and the data generated by the rendering process are transmitted to at least one of the printers.

In a preferred embodiment, the computer program stored on the computer-readable storage medium includes at least one printer driver, which is adapted to generate a printer object with an associated output port, and the stored computer program allows the data processing system to execute a printing process, wherein printers are identified by the first data processing device which can be connected for communication by the first data processing device via a wireless interface and wherein, upon initiation of a printout of contents by using the printer object, at least the following is performed:
  establishing a connection via the output port to a second data processing device, and transmitting to the first data processing device information about printers supported by at least the second or a third data processing device,
  selecting at least one printer that is supported by the second or third data processing device,
  converting with the printer driver the contents to be printed into at least one device-independent format,
  transmitting the contents that is present in a device-independent format and information about the selected printer via the output port to the second data processing device,
  rendering the contents on the second or a third data processing device, and
  transmitting the data generated by the rendering process to at least one of the selected printers.

The invention thus provides a solution that allows a user to print from a mobile terminal, on which only a printer driver capable of generating at least one predetermined format is installed, on any printer in its environment. The only prerequisite is that these printers are installed on the second data processing device or that appropriate printer drivers are available on the second data processing device. A list of available printer drivers is hereby sent from the second data processing device to the terminal (hereinafter also referred to as a client). The second or a third data processing device takes over rendering of the data to be printed for the selected printer.

The invention thus allows a user to print even when no printer-specific printer driver is installed on the user's terminal (for technical or administrative reasons). The terminal of the user requires only at least one program capable of converting contents to be printed into the predetermined device-independent (generic) format and capable of receiving data and transmitting the data to a printer. A second data processing device provides a service which reads the generic format and converts the generic format with the printer-specific printer drivers installed thereon into a printer-specific format. The second data processing device may, for example, be a print server or a server of a service provider. The second data processing device is hence hereinafter also referred to as a server.

The process flow of the process according to the invention is in principle as follows:

a. The user initiates a print order on the terminal.
b. The generic printer driver generates print data in a universal format (e.g. EMF).
c. The server is queried for a list of the printer drivers.
d. The user selects a printer.
e. Driver name and print data in the universal format are transmitted to the server.
f. The server converts the print data from the universal format to a printer-specific format (rendering).
g. The server sends the print data back to the client in the printer-specific format.
h. The client forwards the printer data to a printer connected via WLAN or Bluetooth®.

Preferred embodiments include the following:

The client queries for each print order the printer driver list from the server for obtaining a current list of the available printers.

On the client, the drivers queried from the server and the drivers found independently are matched to find usable printers.

In addition to step c, the client itself carries out a search for printers.

In addition to step c, the client itself has created a list of printer drivers, e.g. printer drivers already found during a previously executed search or printer drivers previously reported by the server.

Steps g and h are not performed; instead, the print data is transferred to a network printer in the printer-specific format.

The server resides in a Cloud; the connection between client and server is then established via the Internet.

Server and client are both located in a LAN.

In wireless connection between the printer and the client, the printer can be accessed either directly or via an access point.

The program module on the client, which generates the print data in the universal format, is an independent module that can be accessed outside the printing process.

Figure 2:
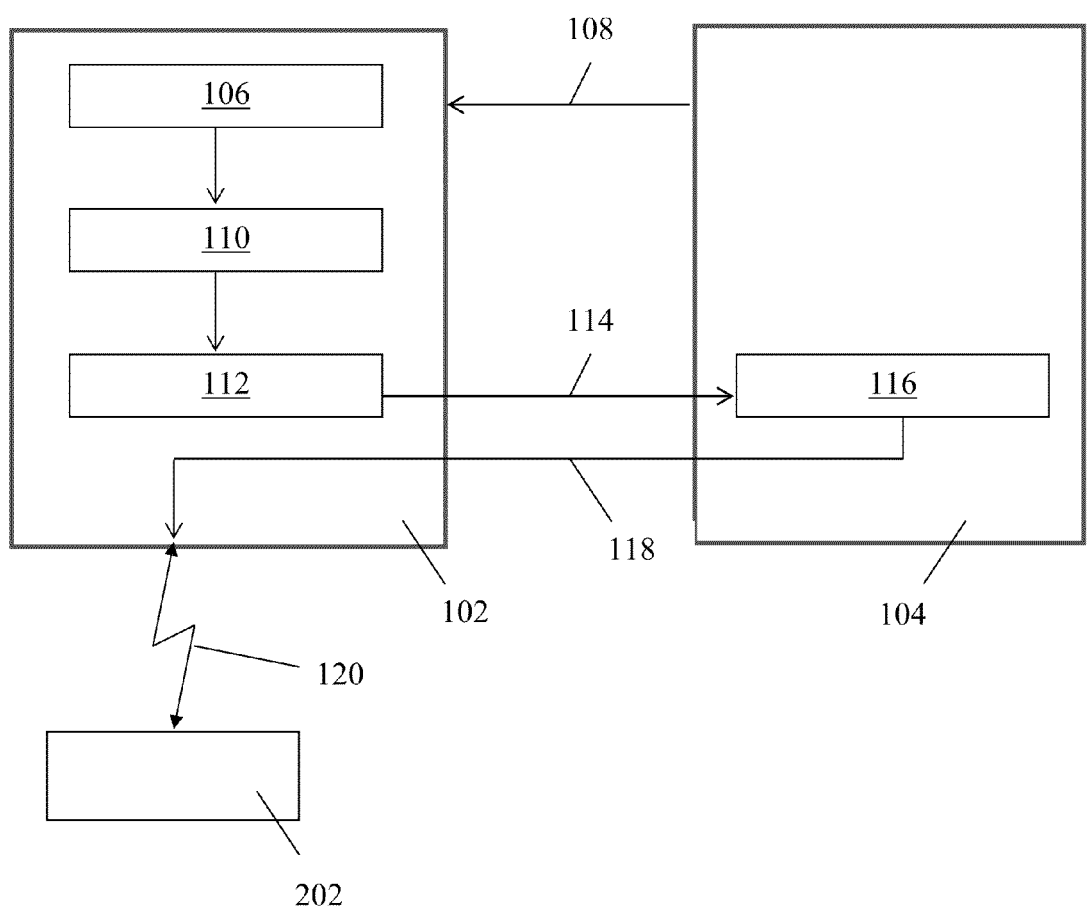
Figure 3:
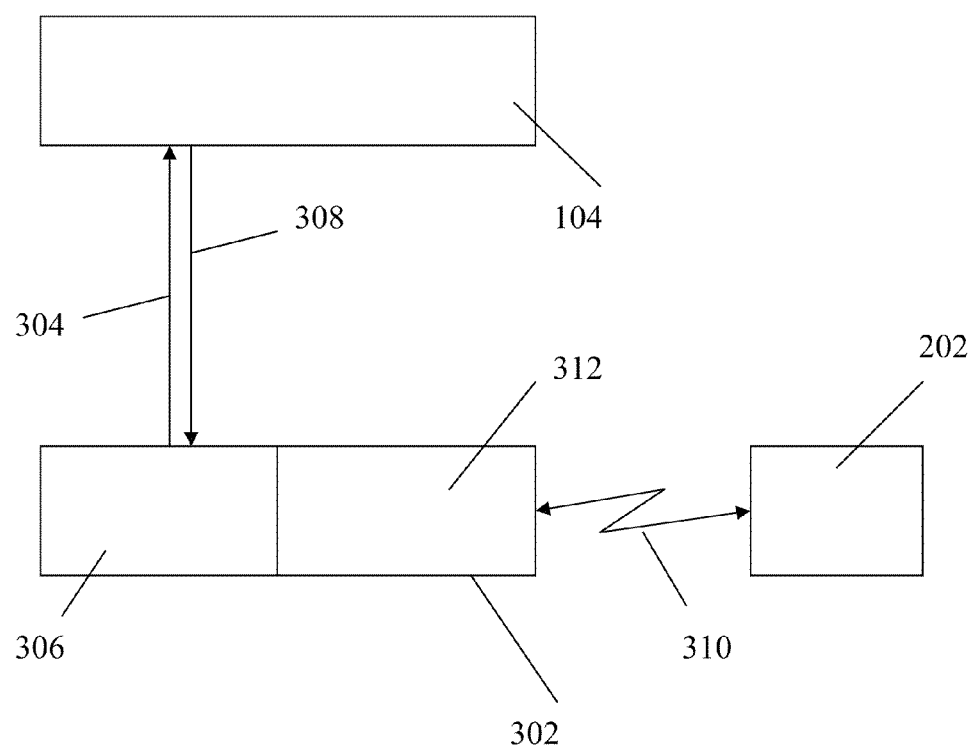

An exemplary embodiment of the invention will be explained below with reference to the figures of the drawings, wherein:

FIG. 1 shows a schematic diagram of an exemplary arrangement for carrying out one exemplary printing process in a Windows® environment, FIG. 2 shows a schematic diagram of the process steps in a process flow of an exemplary embodiment, and FIG. 3 shows a schematic diagram of an exemplary arrangement for carrying out an exemplary print process in Mac OS X-based environment.

The invention will be specifically described hereinafter in more detail in relation to an example of a Cloud printing solution, which enables a client to print, for example from a desktop computer 102 or laptop, on the desktop computer 102 independent of a printer-specific driver installation and printer configuration via Wi-Fi or Bluetooth®.

The invention will allow users to create print orders in the Cloud from documents locally available on the client 102, to then again receive the print data on the client that initiated the print order, such as the desktop computer 102 or the laptop, and to transmit the print data to a locally available printer 202 via W-LAN or Bluetooth®.

This allows users to print
  in networks where they do not have access rights to print directly from their computer, and
  from computers for which they lack administrative rights and are thus unable to install printer drivers
  on any wirelessly accessible printer 202 by using the invention.

The invention will be described in form of examples for both Windows® and Mac OS X.

The invention is hereby not limited to the specific exemplary embodiments, but includes all solutions as long these realize all features of the independent claims.

Architecture when Printing in a Windows® Environment

To use the invention, an enhanced output gateway 204 for converting the contents to be printed into the predetermined generic device-independent format, a program module 208 for adding additional information, such as information about the printer on which the printout is to be printed, and a special port monitor 206 for receiving and transmitting print data are installed on the desktop computer 102 as a printer driver.

The output gateway 204 provides a printer port, over which the print process proceeds.

A special device-independent file is hereby locally generated with the output gateway 204 for final server-side rendering, wherein the device-independent file includes the contents to be printed and is, for example, uploaded to the Cloud, at step 114, with the information relating to the user or user's workplace account and to the selected printer model and printer type (printer driver) of the corresponding locally accessible printer, so as to generate on the server from the contents the print data for the specified printer, at step 116 (as shown in FIG. 2).

The print data are then transmitted back from the server 104 to the output gateway 204, at step 118, and transmitted from there via a wireless communication link 120 to the selected printer 202, for example via Wi-Fi or Bluetooth®.

In an exemplary embodiment, the print data are then deleted by the server after successful transmission.

Printing Via a Private (Closed) Cloud

When printing in connection with a private Cloud, e.g. a proprietary corporate Cloud, the data to be printed are rendered with the printer-specific driver on the integrated corporate server 104, at step 116. The connection to the server 104 and authorization of the desktop computer 102 is here controlled at the output gateway 204, for example, based on corresponding information (server address, user name and password).

When printing with the private Cloud, the company is internally responsible for offering the printer drivers required for printing according to the invention.

Printing Via a Public Cloud

In conjunction with a public Cloud, the data to be printed at step 116 are rendered printer-specific, for example, via hosted servers.

The connection to the server 104 and the authorization of the user is performed here, for example, based on information stored in an enhanced output gateway 204.

When a user prints by way of the public Cloud, he has access to a number of supported printer models, because services are usually offered in the Cloud when a plurality of users is to be serviced. Use of these public services thus makes sense only if they offer a wide range of printer drivers.

To use printing according to the invention, the output gateway 204 is suitably configured. Preferably, the port is set up and the printer object is created already during the installation of the output gateway 204.

According to an exemplary embodiment, a special port monitor 206 for an HTTPS upload to the server 104 may be installed on the desktop computer 102 (HTTPS=Hypertext Transfer Protocol Secure). The user can store access data for access to the server 104 in the output gateway 204 of the installed port. According to an exemplary embodiment of the invention, at least one e-mail address and at least one password may be stored.

After installation of the enhanced output gateway 204, a special inventive printer object is created which prints via a particular created port. The special inventive object corresponds to a special inventive printer installed locally on the desktop computer 102; the special inventive printer is selected and accessed from the local applications like any other locally installed printer.

When the special inventive printer is selected for printing a document, the following steps occur in an exemplary embodiment.

At a first step, the Internet connection is checked. According to an exemplary embodiment, printing via the special inventive printer operates only when an active Internet connection is established, which is necessary for the communication between the desktop computer 102 or laptop and the server 104 in the private or public Cloud. If an Internet connection is not set up when printing is initiated at step 106, a corresponding message is sent to the user.

After the Internet connection has been successfully tested, the connection to the server 104 used for printing is established and the list of available printer models and drivers is loaded, at step 108, and offered to the user during initiation of the printing process.

After initiating the printout in the print menu of the special inventive printer, at step 106, and with an existing Internet connection, it is queried at the next step whether printing will be carried out via WLAN or Bluetooth®. Depending on the selection, the WLAN is then queried for available printers, at step 110, or all devices accessible via Bluetooth® are displayed. The user selects the printer to be used for printing from the respective list.

After selecting a printer, the user can select, at step 112, the printer model and then the printer driver on the list provided by the server at step 108. After confirming the selection, all information along with the document to be printed is transmitted to the server 104 in the private or public Cloud, at step 114. The print job is then generated (rendered) in the Cloud, at step 116, and the rendered print data are sent back to the initiating desktop computer 102, at step 118, and from there transmitted via a wireless communication link 120 to the selected printer 202.

Architecture when Printing in a Mac Environment

Similar to printing in a Windows® environment, a program module 312 is installed on a desktop Mac 302 running the operating system Mac OS X; the program module 312 adds additional information, such as for example particular information about the printer on which the print job is to be printed, in a predetermined, generic device-independent format (in the case of Mac OS X a PDF format).

Due to the printing system CUPS used with the Mac OS X and the peculiar features used for printing on a Mac, which are different from a Windows® environment, a *.pdf file is transmitted to the server 104 in the Mac OS X environment. (step 304).

A backend tool 306 on the desktop Mac 302 provides here also a printer port over which the printing process is carried out.

A *.pdf file is generated locally for the final server-side rendering, which is then uploaded to the Cloud together with the information about the user and/or the user's workplace account as well as the selected printer model and printer type (printer driver) of the corresponding locally accessible printer, so as to generate on the server the print data for the specified printer.

The print data are then transmitted back from the server 104 to the backend tool 306, at step 308, and transmitted from there via a wireless communication link 310 to the selected printer 202 via WLAN or Bluetooth®.

According to an exemplary embodiment, the print data are here also deleted on the server after successful transmission.

The other process steps, such as for example initiating printing, determining the locally accessible printers, querying the supported printer drivers, and selecting the printer on which the printout is to be printed, are similar to the aforedescribed steps in a Windows® environment.

The invention is not limited in its embodiment to the aforedescribed preferred exemplary embodiments. Rather, a number of variants are conceivable which make use of the inventive process, the inventive arrangement, the inventive computer program and the inventive computer-readable storage medium even with fundamentally different embodiments.

The invention claimed is:

1. A printing process, wherein a printer driver adapted to generate a printer object with an associated output port is stored on a client device, and wherein printers that can be connected for communication via a wireless interface from the client are determined by the client device, and wherein when a printout of contents is initiated by using the printer object, at least the following process steps are performed:

establishing a connection via the output port to a server device, and transmitting to the client device information about printers supported by at least the server device, wherein the server device resides in a proprietary corporate cloud and the connection between the client device and the server device is established via the internet, wherein the connection to the server device and authorization of the mobile device is controlled at an output gateway of the printer driver based on corresponding information including the server address, a user name and password, matching printers accessible with the client device and printers supported by the server device to a list, selecting at least one printer from the list on the client device, converting, with the printer driver on the client device, the contents to be printed into at least one device-independent format, adding, by the printer object on the client device, information about the selected printer to the contents in a device-independent format, transmitting the contents that is present in a device-independent format and the information about the selected printer via the output port to the server device, determining, on the server device, a printer driver associated with the selected printer by evaluating the information about the selected printer, rendering, with the determined printer driver, the contents on the server device, and transmitting the data generated by the rendering process to at least one of the selected printers.

2. The printing process according to claim 1, wherein the information about the printers supported by the server device includes at least information about the printer drivers of the supported printers.

3. The printing process according to claim 1, wherein the information about the supported printer and/or about the printers that can be connected for communication via a wireless interface is offered to a user for selection on a graphic user interface.

4. The printing process according to claim 1, wherein the information about the supported printers is automatically matched to the information about the printers that can be connected for communication via a wireless interface and automatically the intersection of the supported and the connectable printers is formed, and at least part of the intersection is offered to a user for selecting at least one printer.

5. The printing process according to claim 1, wherein the printing process is started from an application by activating a print function.

6. The printing process according to claim 1, wherein the printer object is integrated in the print system of the client device and is offered as a printer in a print menu upon activation of the print function in an application running on the client device and is selectable for printing.

7. The printing process according to claim 1, wherein the data generated by rendering are transmitted to the client device and are printed on at least one of the printers, wherein the at least one printer is connected for communication with the client device.

8. The printing process according to claim 1, wherein information about printer drivers usable for rendering is communicated from the server device to the client device and at least a part of the information about the at least one printer on which the contents is to be printed, is deduced from this information.

9. A computer program stored in a non-transitory computer-readable storage medium, which enables a data processing device, after the computer program has been loaded into memory means of the data processing device, to carry out the printing process according to claim 1.

10. A non-transitory computer-readable storage medium on which a program is stored which enables a data processing device allows, after the program has been loaded into memory means of the data processing device, to carry out the printing process according to claim 1.

11. An arrangement with at least one chip and/or processor, wherein the arrangement is configured to carry out the printing process according to claim 1.

* * * * *